(12) United States Patent
Suresh

(10) Patent No.: US 9,014,731 B2
(45) Date of Patent: Apr. 21, 2015

(54) METHOD AND SYSTEM TO ENABLE COMMUNICATION THROUGH SMS COMMUNICATION CHANNEL

(71) Applicant: Narasimha Suresh, Bangalore (IN)

(72) Inventor: Narasimha Suresh, Bangalore (IN)

( * ) Notice: Subject to any disclaimer, the term of this patent is extended or adjusted under 35 U.S.C. 154(b) by 248 days.

(21) Appl. No.: 13/626,158

(22) Filed: Sep. 25, 2012

(65) Prior Publication Data

US 2014/0087773 A1   Mar. 27, 2014

Related U.S. Application Data

(62) Division of application No. 11/734,295, filed on Dec. 4, 2007, now Pat. No. 8,295,862.

(51) Int. Cl.
*H04W 4/00* (2009.01)
*H04W 4/14* (2009.01)
*H04W 88/16* (2009.01)

(52) U.S. Cl.
CPC ............... *H04W 4/14* (2013.01); *H04W 88/16* (2013.01)

(58) Field of Classification Search
USPC ............ 455/466, 422.1, 512, 434, 408; 379/201.3, 230, 88.13; 714/774; 709/225
See application file for complete search history.

(56) References Cited

U.S. PATENT DOCUMENTS

| | | | |
|---|---|---|---|
| 6,085,099 A * | 7/2000 | Ritter et al. | 455/466 |
| 7,003,307 B1 * | 2/2006 | Kupsh et al. | 455/466 |
| 2002/0119793 A1 * | 8/2002 | Hronek et al. | 455/466 |
| 2006/0291502 A1 * | 12/2006 | Kalofonos | 370/466 |
| 2007/0230668 A1 * | 10/2007 | Brown et al. | 379/88.14 |
| 2008/0051118 A1 * | 2/2008 | Shin | 455/466 |

* cited by examiner

*Primary Examiner* — Mahendra Patel

(57) ABSTRACT

The present invention provides a method and system to provide network aware applications on a mobile device that can communicate using existing SMS communication channels without resorting to other IP based communication channels that are costlier and are not available on many of the networks.

4 Claims, 11 Drawing Sheets

603

METHOD AND SYSTEM TO ENABLE COMMUNICATION THROUGH SMS COMMUNICATION CHANNEL

CROSS-REFERENCE TO RELATED APPLICATIONS

This is a divisional application of the U.S. application Ser. No. 11/734,295 filed on 12 Apr. 2007. The content of said application is hereby incorporated by reference in its entirety.

TECHNICAL FIELD

The invention relates to the field of telecommunications. More particularly the present invention relates to telecommunications using SMS as communication channel.

BACKGROUND AND PRIOR ART

SMS is one of the most important medium of communication today. Most wireless phones come with a standard SMS client along with a simple text based user interface (UI). These SMS clients resemble the command prompt on the PC world.

Due to the huge boom in mobile commerce, various companies are trying to use the SMS medium to generate more revenue by creating customized advertisements, innovative contests for people to participate in, and allowing people to download various multi-media content including music, images, ring tones etc. Access to each of these services requires users who want to participate to remember certain commands to be sent using SMS so that the SMS is interpreted in the desired manner. Users need to remember such commands and also type the messages which is a tedious process specially considering the fact that most mobile phones come with a keypad where each key is linked to three letters or four letters.

With the advancement of technology especially in computing, mobile devices are becoming more and more sophisticated. Today many such devices are able to run operating systems like winCE and Symbian OS that allow custom applications to be built the same way applications are built to be run on a PC. While there exist many such applications, most of these applications require access to Internet Protocol (IP) based communication channels like WAP or GPRS to communicate. And these technologies are not accessible to every mobile user either because a service provider does not provide the facility or accessing networks implementing these technologies means additional cost for the users.

There exists a need to provide the services to mobile phones which do not have IP access with the existing facilities available on the phone. The utilization of SMS as a channel of communication facilitates the user of a mobile phone to access information over the Telecommunication network.

SUMMARY OF THE INVENTION

A primary object of the invention is to enable communication for various applications using existing SMS communication channels.

Another object of the invention is to avoid the necessity to used IP based communication channels for communication.

Accordingly, the present invention provides a method and system to provide network aware applications on a mobile device that can communicate using existing SMS communication channels without resorting to other IP based communication channels that are costlier and are not available on many of the networks.

According to one embodiment of the method of the invention, a user's terminal station (for example, a mobile phone) receives a message with a question and a set of options to be chosen; before the message is processed by the standard SMS module on the terminal station, a middleware checks the message and sends it to a network aware application (for example, embedded client); the network aware application presents an interface for the user to select or enter a choice; the choice selected or entered by the user is converted into a command that can be interpreted by the middleware; middleware encodes the command and sends the command as an SMS through an SMS gateway; gateway decodes the command of the message and handles the command to a middleware at a central station; the middleware at the central station gets a response based on the command; the response is converted into a command that the network aware application can understand; the command is encoded and sent back to the user's terminal station as one or more SMS messages; middleware decodes the command of the message and handles the command to the network aware application; and the network aware application reconverts the command into a response, renders the response and builds a user interface to show the response to the user.

According to one embodiment of the system of the invention, there is provided plurality of network terminal stations (for example, mobile phones, PDAs, computers) each terminal station running various network aware applications managed by a middleware, the middleware listening to a specific port on the terminal station to check for incoming messages; a central station (for example, a server) to provide application services to the various network aware applications running on the network terminal station; an SMS gateway to facilitate SMS communication between a network terminal station and the central station; and a network connection connecting the plurality of network terminal stations, the central station, and the SMS gateway.

According to another aspect of the invention, an network aware application being controlled by a middleware is used to send messages to a short code or a value added service (VAS). The network aware application itself can be a browser for accessing a plurality of short code based SMS services or VASs. The network application is bundled with a meta information of available SMS based services, the number (for example, mobile number) for the gate way that is delivering the services and the parameters that a user needs to select or enter for each of the service. The network aware application, when opened, lists all the services that are available with a SMS gateway according to the meta information. Based on service selected, the network aware application displays the associated parameters that the user needs to select or enter. For example, when a user selects a survey, the network aware application displays the choices or when the user selects a information service the network aware application displays a select box for user to enter his email id. Based on user selection requests gets submitted to SMS gateway. SMS gateway responds back with the response as it responds to request typed by users as SMS.

In another embodiment of the invention, two or more terminal stations (for example, mobile phones) communicate with each other simultaneously using SMS communication channel. For example, such multi-user communication can be used to play multi-player games on mobile phones and for collaborative discussions.

Further objects, features and advantages will become apparent from the following description, claims and drawings.

BRIEF DESCRIPTION OF THE DRAWINGS

The above aspects of the invention are described in detail with reference to the attached drawings, where.

DETAILED DESCRIPTION OF THE INVENTION

Figure 1:
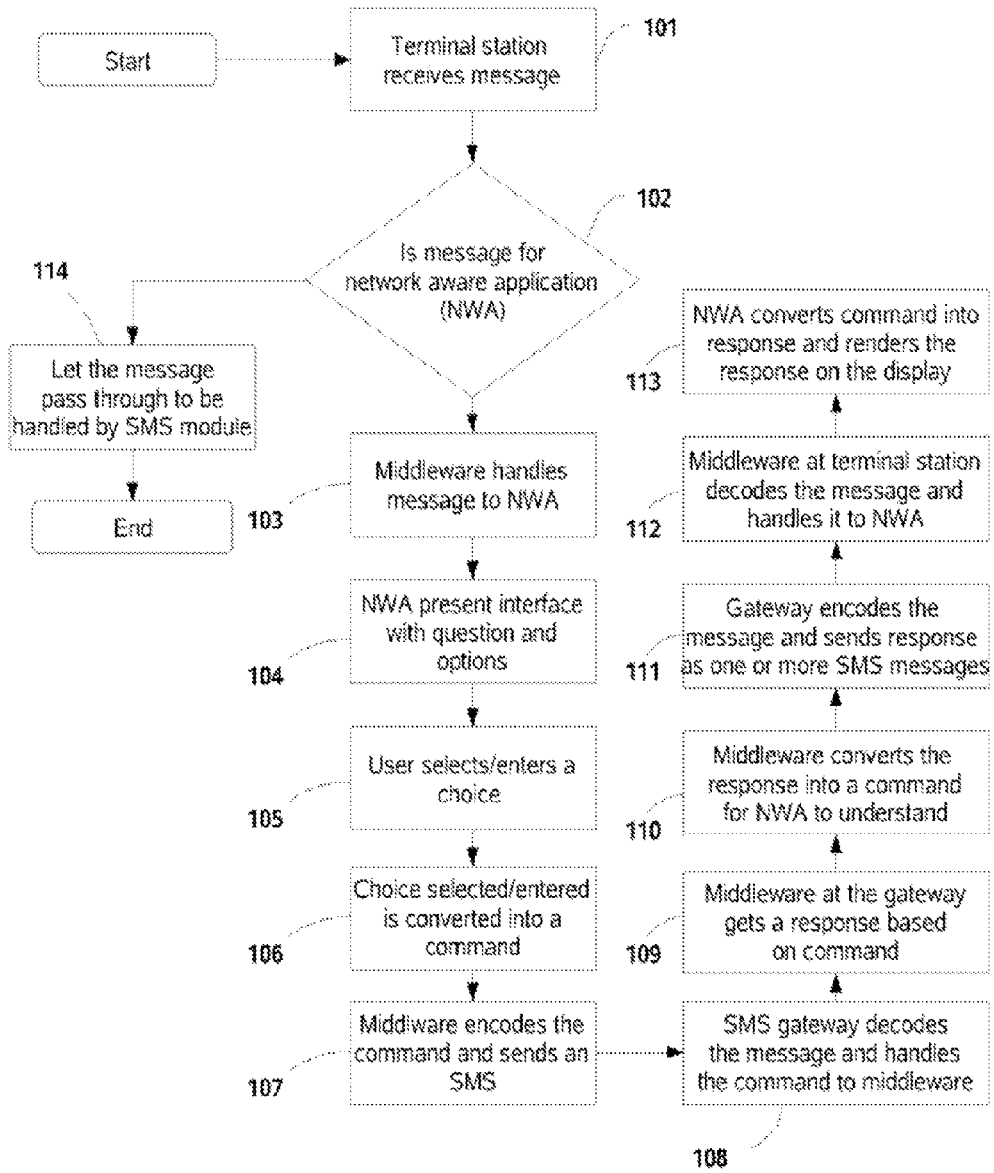
FIG. 1 illustrates one embodiment of the method of the invention through a flow chart.

FIG. 1 illustrates one embodiment of the method of the invention, the method described herein is accompanied by the steps illustrated in the flowchart in FIG. 1

A user's terminal station, examples of the terminal station including and not limited to a mobile phone, receives a message with a question and a set of options to be chosen (101). The message which is received by the user terminal station is checked by a middleware (ex: an embedded software program). The middleware checks if the received message is intended for the network aware application (NWA) including but not limited to an embedded client (102). The embedded client can be written in programming languages including but not limited to Embedded C, on platforms including but not limited to Windows, Linux, Embedded 2 Micro Edition, Brew. The message is passed to a standard SMS module of the terminal station (114) if the middleware determines that the message is not intended for NWA. If the middleware determines that the received message is intended to NWA, the message is handed over to the NWA by the middleware (103). NWA present in the user's terminal station presents and interface with questions and options to the user (104). The user of the terminal station selects or enters a choice on the interface (105). The choice selected or entered by the user is converted into a command that can be interpreted by the middleware (106). The middleware encodes the command and sends the command as an SMS through an SMS gateway (107). The SMS gateway decodes the received command of the message and handles the command to a middleware at the central station (108). The middleware at the central station gets a response based on the command from the Data Store (109). The middleware converts the response into a command that NWA can understand (110). The aforementioned command is encoded and sent back to the user's terminal station as one or more SMS messages (111). The user's terminal station receives the SMS messages; the middleware in the terminal station decodes the command of the message and handles the command to the NWA (112). The NWA reconverts the command into a response, renders the response and builds a user interface to show the response to the user (113).

Figure 2:
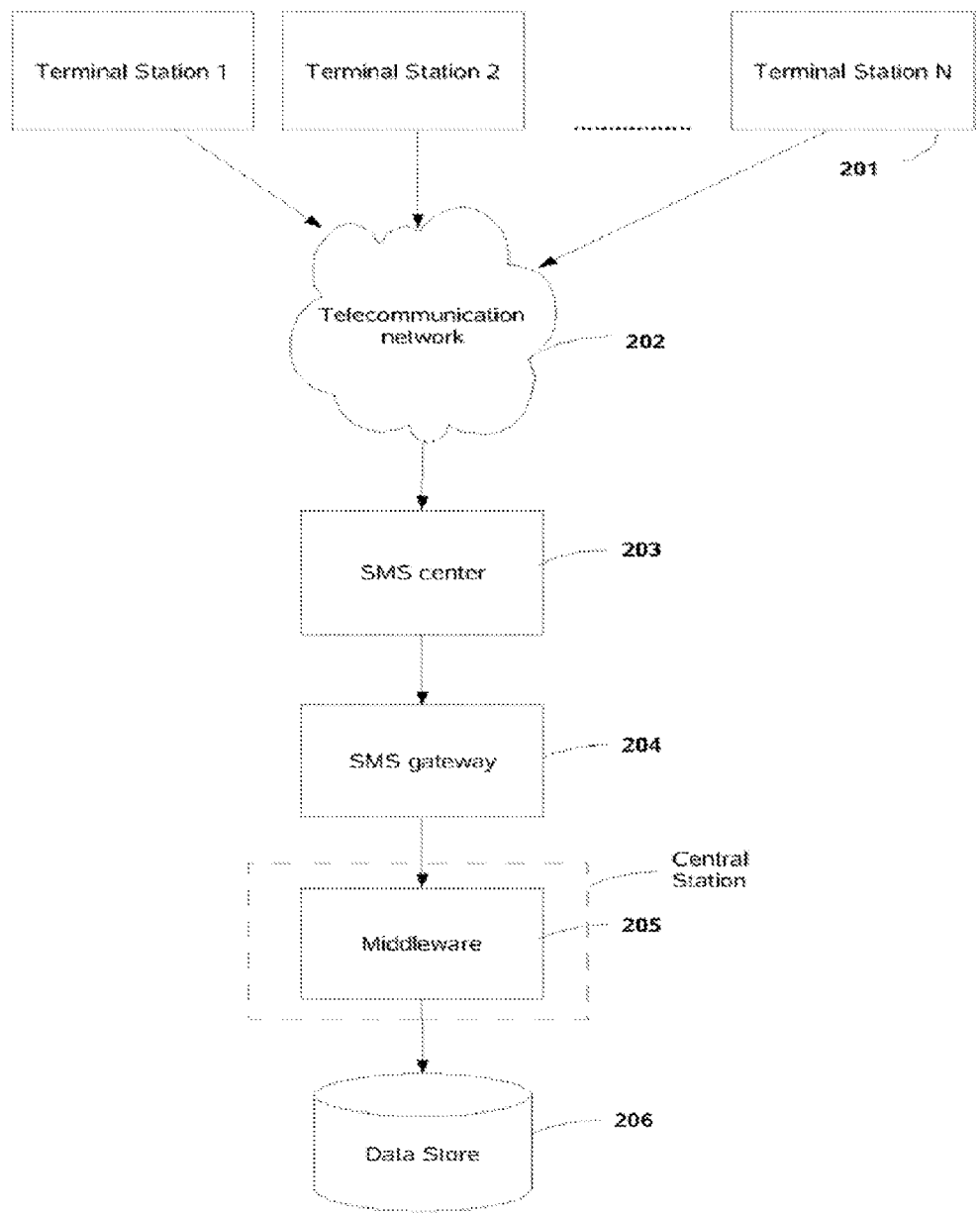
FIG. 2 illustrates the system of the invention

FIG. 2 illustrates one embodiment of the block diagram of the components of the system involved in rendering the method described in FIG. 1 functional. The system includes a plurality of terminal stations (201) wherein the terminal station can include but is not limited to the mobile device. The plurality of terminal stations (201) interacts with the server over the Telecommunication network (202). The SMS Center (203) receives the encoded command over the Telecommunication Network (202) from the plurality of terminal stations (201) and sends the encoded command which is the response to the hereinabove mentioned command from the terminal station to the corresponding terminal station. The SMS Gateway (204) decodes the command received from the SMS Centre (203) and handles the command to a middleware at the central station (205). The SMS Gateway further encodes the command received from the middleware (204) in response to the aforementioned command. The middleware (205) for gets a response based on the command from the Data Store (206). Further, the middleware (205) converts the response into a command that NWA can understand. Data Store (206) is a server capable of servicing requests along with data.

Figure 3:
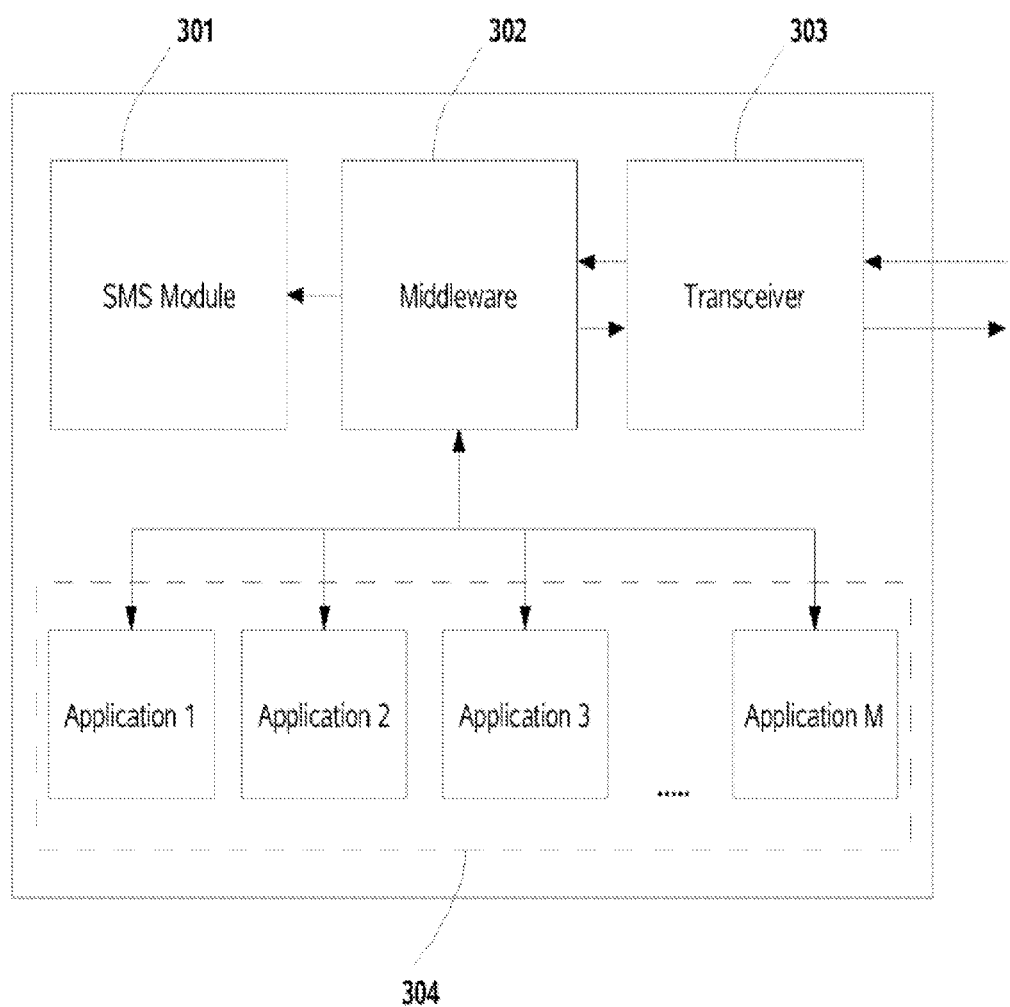
FIG. 3 shows the block diagram of a terminal station

In FIG. 3, The SMS Module (301) handles the normal SMS messages. The middleware (302) interrupts all the messages received by the mobile device. Further, the middleware (302) checks if the SMS message is intended for the plurality of Applications (304) including but not limited to network aware applications which can include but not limited to embedded client. Further, the middleware (302) handles the message to the SMS module in the event of the message is not intended to the plurality of applications (304). The middleware (302) further transmits and receives the messages to the Transceiver (303).

Figure 4:
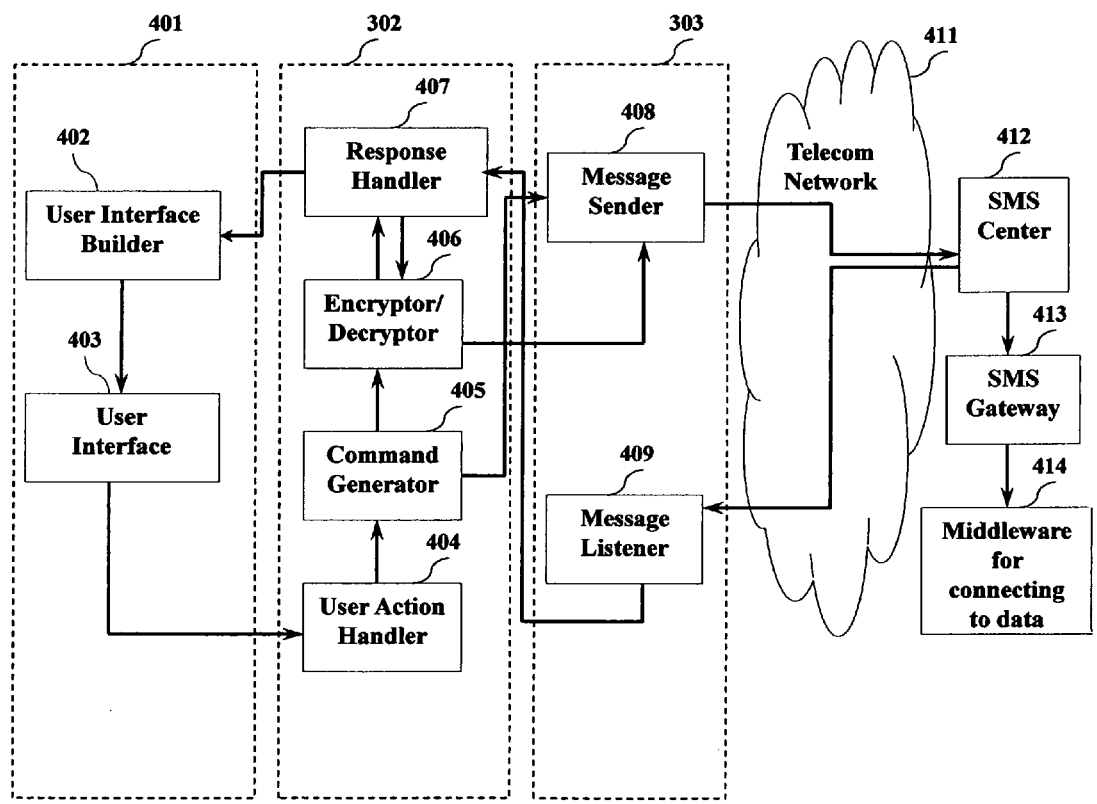
FIG. 4 shows the logical diagram of the system of the invention
Figure 5A:
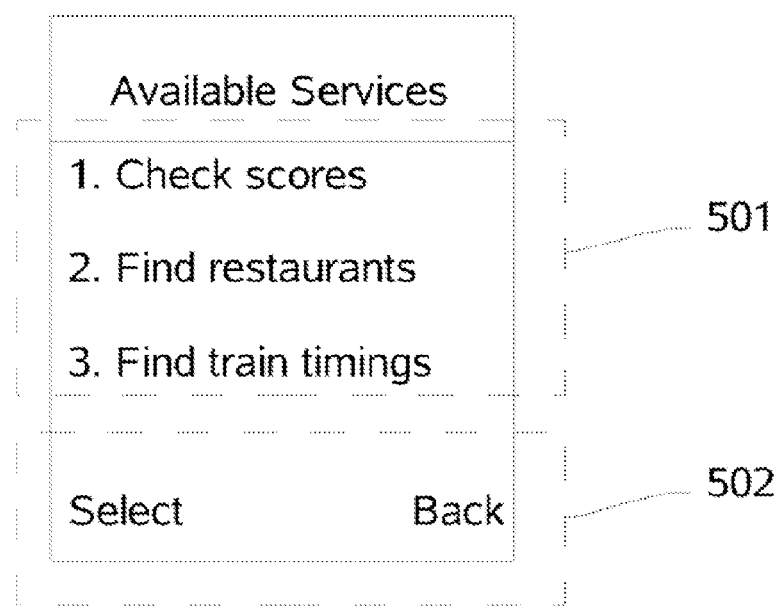
FIGS. 5A, 5B, 5C and 5D shows the screen shots of the display of a terminal station for an example application
Figure 5B:
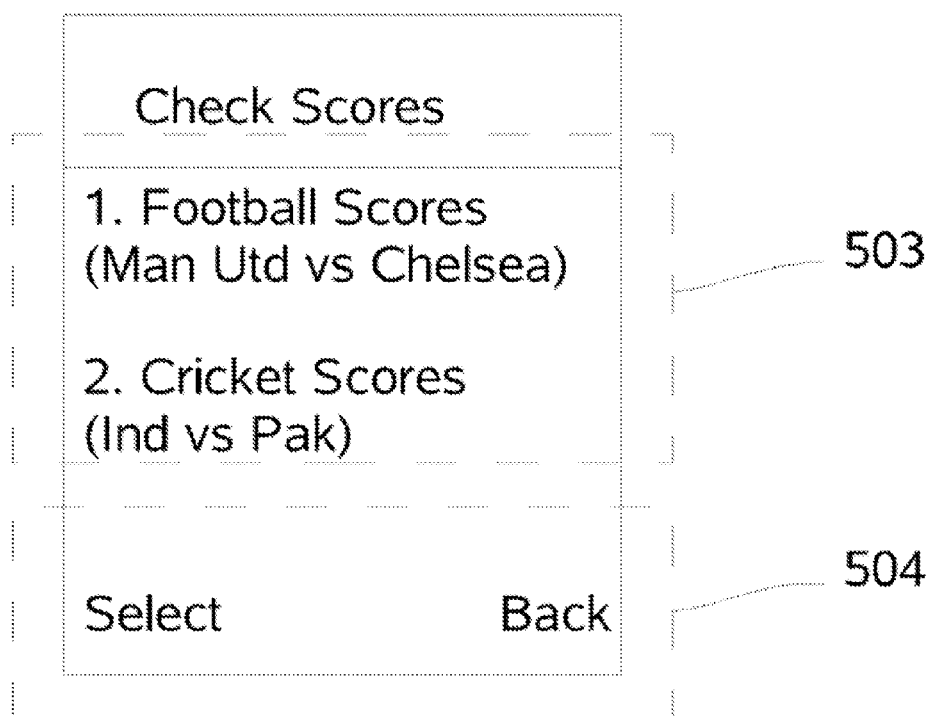
Figure 5C:
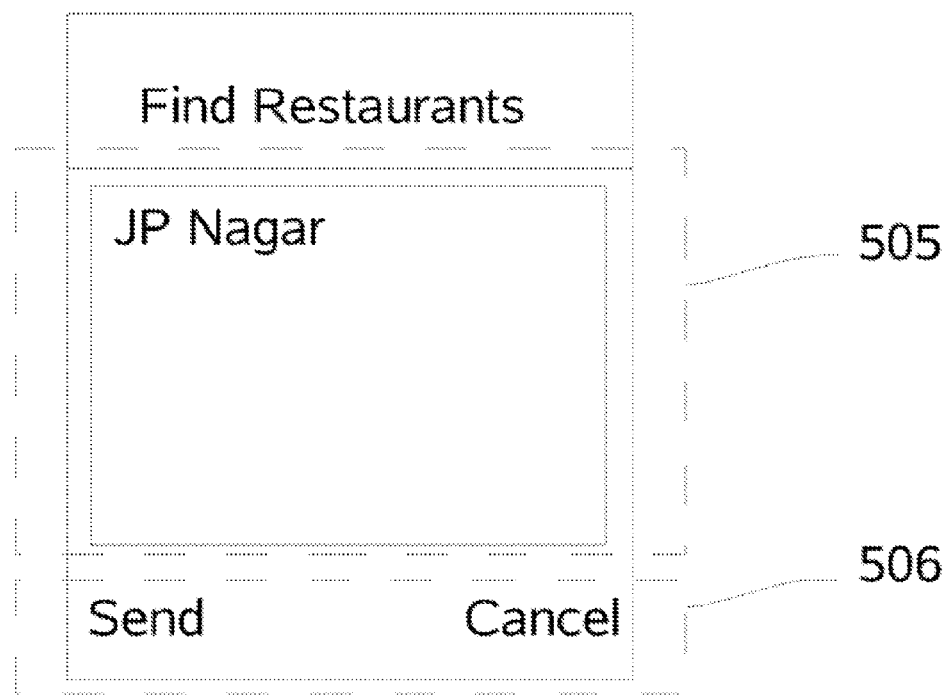
Figure 5D:
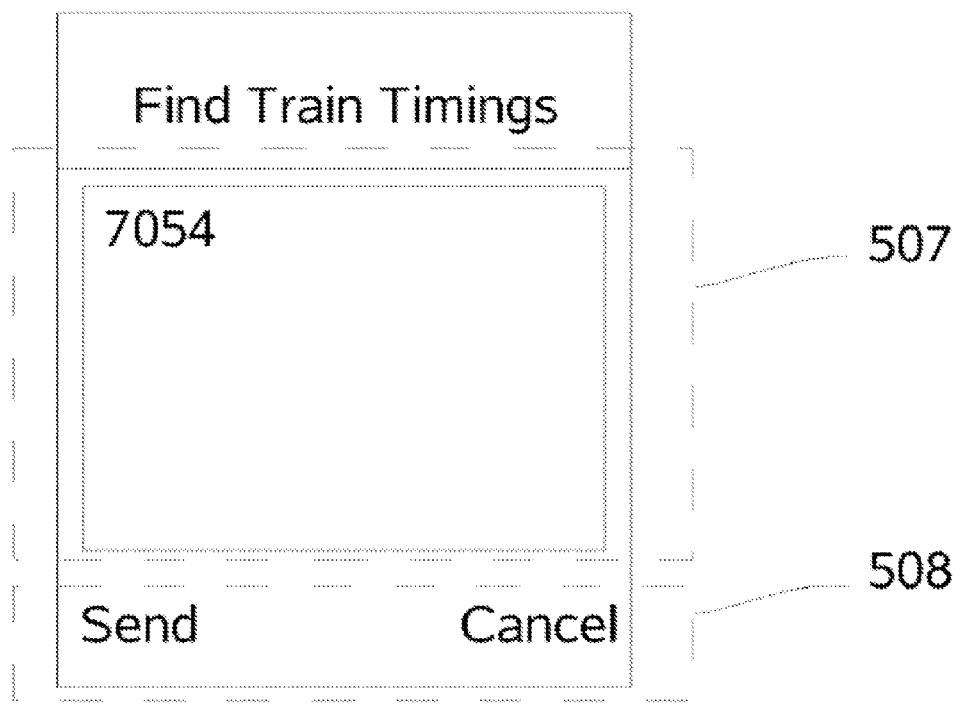

FIG. 4 illustrates interaction between some of the modules in the mobile device with the server over the Telecommunication Network (202).

In FIG. 4, the User Interface Module (401) comprises of:
1. User Interface Builder (402) contains the meta information of available SMS based services, the mobile number for the SMS gateway (413) that is delivering the services and the parameters that the user needs to enter or select for each of the services.
2. User Interface (403) is built by the NWA when opened by using the meta data information contained in the User Interface Builder (402).

In FIG. 4, the middleware (302) comprises of:
1. User Action Handler (404) to display the associated parameters when the user has to enter an answer or select an option from available options.
2. Command Generator (405) to convert the response of the user into a command that can be decoded by the SMS gateway (204).
3. Encryptor/Decryptor (406) encodes the command where the algorithms including but not limited to standard encoding are used for encoding. The encoding of the command is optional and is dependent on the application.
4. Response Handler (407) receives the decoded response from the Encryptor/Decryptor (406) and sends it to the User Interface Builder (402).

In FIG. 4, the Transceiver (303), comprises of:
1. Message Sender (408) to send the encoded command received from the Encryptor/Decryptor (405) or the command which is not encoded received from the Command Generator (406) as SMS by emulating the role of an SMS client.
2. Message Listener (409) receives the messages through the Telecommunication Network (202) by listening to specific SMS port and interprets the relevant message.

In FIG. 4, the interaction of the mobile device with the server is communicated over the Telecommunication Network (202).

Example 1

FIG. 5 illustrates an example of the browser of the various short code based services. The services available in the NWA (501) is displayed to the user, (502) displays the available user actions to the options on the interface where the user can "Select" a service or return "Back" to the previous active browser screen.

In FIG. 5, (503) displays the options available in the event of the user selecting the first option "Check scores" in (501). The different scores available with the NWA is displayed as shown in (503). (504) displays the available user actions to the options on the interface where the user can "Select" a service or return "Back" to the previous active browser screen.

The message sent from the user terminal which is interrupted by the middleware (302) is: 76548, 00056765, Check scores, FB scores.

In the above example, 76548 is the short code, 00056765 is the Customer ID, "Check scores" is the option selected by the user, "FB scores" is the specific choice of the user among the options available for "Check scores".

In FIG. 5, (505) displays user terminal in the event of the user selecting the second option "Find Restaurants" in (501). The user types further details regarding the restaurant he wishes to find in the interface as shown in (505); the user can "Send" the details entered in (505) or "Cancel" the entry of the text shown in (506).

The message sent from the user terminal which is interrupted by the middleware (302) is: 76548, 00056765, Find Restaurant, "J P Nagar".

In the above example, 76548 is the short code, 00056765 is the Customer ID, "Find Restaurant" is the option selected by the user, "J P Nagar" is the text entered by the user indicating the location.

In FIG. 5, (507) displays the user terminal in the event of the user selecting "Find train timings" in (501); the user enters the text of the train details as shown in (507); further the user can "Send" the details entered in (507) or "Cancel" the entry of the text to return to (507) to enter a new text as shown in (508).

The message sent from the user terminal which is interrupted by the middleware (302) is: 76548, 00056765, Find train timings, "7054".

In the above example, 76548 is the short code, 00056765 is the Customer ID, "Find train timings" is the option selected by the user, "7054" is the text entered by the user indicating the train number.

Example 2

Figure 6A:
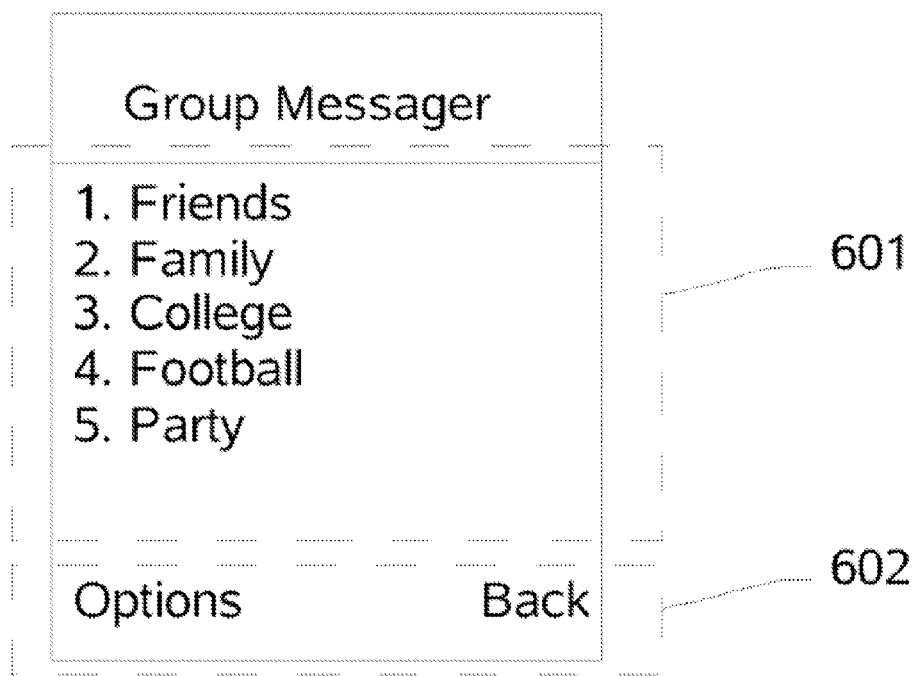
FIGS. 6A, 6B, and 6C shows the screen shots of the display of a terminal station for an example application
Figure 6B:
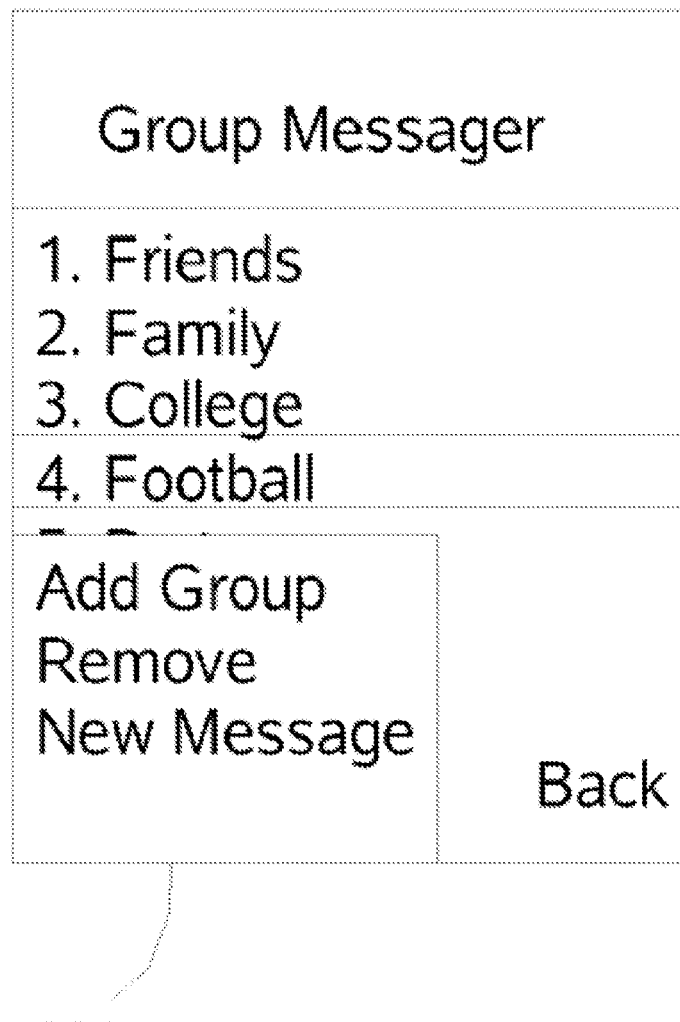
Figure 6C:
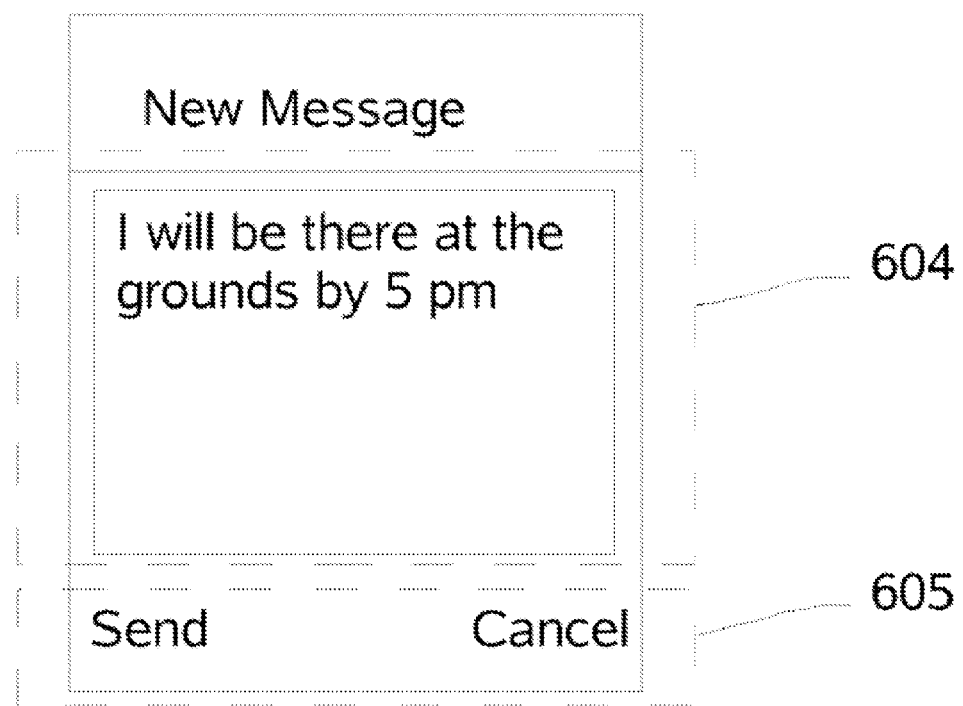

FIG. 6 illustrates another example wherein multiple users in groups are sent the same message. The groups available to the user terminal is displayed as shown in (601). The user can further view the "Options" available in the NWA or move "Back" to the previously active browser window as shown in (602). The "Options" available in the Group Messager is as shown in (603). The "New Messages" interface window which will be displayed on the user's terminal if the user selects the "New Message" in (603) is as shown in (604). The user can "Send" the typed message in (604) or "Cancel" the typed message as shown by (605).

Although the present invention has been described with particular reference to specific examples, variations and modifications of the present invention can be effected within the spirit and scope of the following claims.

I claim:

1. A system to enable communication through SMS communication channel comprising:
   a plurality of network terminal stations each terminal station running a plurality of network aware applications managed by a middleware, the middleware listening to a specific port on the terminal station to check for incoming messages;
   a central station to provide application services to the various network aware applications running on the plurality of network terminal stations;
   an SMS gateway to facilitate SMS communication between a plurality of network terminal stations and the central station;
   a network connection connecting the plurality of network terminal stations, the central station, and the SMS gateway,
   wherein each terminal station comprises of: a user interface module, a middleware; and a transceiver; and
   wherein said user interface module further comprises of a user interface builder comprising the meta information, wherein the meta information comprising information at least of available SMS based services, mobile numbers for the SMS gateways that are delivering the services and parameters that a user needs to enter or select for each of a plurality of services to build said user interface.

2. The system as claimed in claim 1, wherein said middleware further comprises of:
   a user action handler to display the associated parameters when the user has to enter an answer or select an option from available options;
   a command generator to convert responses of users into command that can be decoded by the SMS gateway;
   a Encryptor/Decryptor module to encode/decode commands; and
   a response handler to receive the decoded response from the Encryptor/Decryptor and forward to the user interface builder.

3. The system as claimed in claim 1, wherein said transceiver further comprises of:
   a message sender to send the encoded command received from the Encryptor/Decryptor or the command which is not encoded received from the Command Generator as SMS by emulating the role of an SMS client; and
   a message listener to receive the messages through telecommunication Network by listening to specific SMS ports and to interpret a received message.

4. The system as claimed in claim 1 wherein a network aware application is a browser for accessing a plurality of short code based SMS services or VASs.

* * * * *